United States Patent [19]

Lewis, Jr.

[11] 4,415,918

[45] Nov. 15, 1983

[54] DIGITAL COLOR TELEVISION SIGNAL DEMODULATOR

[75] Inventor: Henry G. Lewis, Jr., Hamilton Square, N.J.

[73] Assignee: RCA Corporation, New York, N.Y.

[21] Appl. No.: 297,556

[22] Filed: Aug. 31, 1981

[51] Int. Cl.³ .............................................. H04N 9/50
[52] U.S. Cl. .................................... 358/23; 358/21 R
[58] Field of Search .................. 358/23, 13, 24, 21 R; 329/50

[56] References Cited

U.S. PATENT DOCUMENTS

| | | |
|---|---|---|
| 4,270,139 | 5/1981 | Flamm et al. |
| 4,307,414 | 12/1981 | Lee ........................................ 358/31 |
| 4,333,104 | 1/1982 | Geller . |
| 4,344,040 | 8/1982 | Reilly et al. .......................... 329/50 |

FOREIGN PATENT DOCUMENTS

| | | |
|---|---|---|
| 1377684 | 12/1974 | United Kingdom . |
| 1527453 | 10/1978 | United Kingdom . |
| 1529544 | 10/1978 | United Kingdom . |
| 1540183 | 2/1979 | United Kingdom . |
| 1562865 | 3/1980 | United Kingdom . |
| 1575863 | 10/1980 | United Kingdom . |

OTHER PUBLICATIONS

Article "Color Decoding a PCM NTSC Television Signal" by J. P. Rossi, Jun. 1974 Journal of the SMPTE vol. 83, No. 6, pp. 489–495.
Article "Digital Television Image Enhancement" by J. P. Rossi, 1975 Journal of the SMPTE, vol 84, at pp. 545-551.
Text "Theory and Application of Digital Signal Processing" by Rabiner and Gold (Prentice-Hall, 1975), p. 550.
Paper "Nonrecursive Digital Filters With Coefficients of Powers of Two" by A. Tomozawa, in the IEEE Int'l. Conf. on Comm., pp. 18D-1 through 18D-5.
Paper "Colour Demodulation of an NTSC Television Signal Using Digital Filtering Techniques" by A. G. Deczky, 1975 IEEE Int'l. Conf. on Comm., vol. II, pp. 23-6 through 23-11.

*Primary Examiner*—Richard Murray
*Attorney, Agent, or Firm*—E. M. Whitacre; P. J. Rasmussen; C. A. Berard, Jr.

[57] ABSTRACT

A digital filter arrangement is provided which both demodulates and filters the color mixture signals in a television receiver. Samples of a digital chrominance signal are clocked into first and second registers such that the first register is loaded with samples of a first color mixture signal and the second register contains samples of a second color mixture signal. Output taps are connected between various ones of the stages of the first and second registers and weighting function circuits. The weighting function circuits associated with each register are in turn coupled to respective ladder networks of adders, which combine the weighted signals samples so as to exhibit, at an output stage adder, a lowpass response characteristic which is appropriate for the respective color mixture signal. The two digital registers are aligned in time in accordance with their respective peak impulse response characteristic to product filtered color mixture signals in a proper timed relationship.

12 Claims, 11 Drawing Figures

DIGITAL COLOR TELEVISION SIGNAL DEMODULATOR

This invention relates to television receivers in which the detected video signal is processed by digital circuitry and, in particular, to a digital color signal demodulator which provides filtering of the demodulated color signals.

For reasons relating to factors such as bandwidth, speed and complexity, television signal processing circuits are conventionally constructed in analog form. However, recent advances in analog to digital converter speed and large scale integrated circuit technology have made the implementation of television circuits using digital technology realizable. Due to bandwidth requirements, television intermediate frequency circuitry is yet constrained to contruction in analog form, but baseband video signal processing is susceptible to digital techniques. In a digital baseband receiver, the detected video signal is converted to a digital signal by an analog to digital converter, which samples the video signal at a rate at least equal to the Nyquist sampling rate for the video signal band (e.g., the NTSC video signal of 4.2 MHz must be sampled at a frequency of at least 8.4 MHz). The digitized video signal is then separated into luminance and chrominance components by digital filtering, such as digital comb filtering. The luminance and chrominance components may then be processed in separate digital signal paths, converted back to analog form, and recombined in a matrix to produce red (R), green (G) and blue (B) signals for the kinescope in the receiver.

In the chrominance channel, the digital color signals are generally amplified and bandpass filtered or peaked prior to demodulation. The color signals are then demodulated at selected phase angles of the color subcarrier signal to produce either I and Q color mixture signals or R-Y and B-Y color mixture (difference) signals. The demodulated color mixture signals are then filtered to remove high frequency noise from the signals. In the instance of the I and Q signals, the I signal has a bandwidth of 1.5 MHz and the Q signal has a bandwidth of 0.5 MHz. The color difference signals both have bandwidths of 0.5 MHz. The color difference signals can then be combined to produce the G-Y difference signal, and all three difference signals may then be converted to analog form, filtered to remove sampling frequency components, and matrixed with the luminance signal (Y) to produce the R, G and B signals. In the case of the filtered I and Q signals, these signals can be converted to analog form, filtered to remove sampling frequency components, and matrixed with the Y signal to produce the R, G and B signals.

In accordance with the principles of the present invention, a digital filter arrangement is provided which both demodulates and filters the color mixture signals in a television receiver. Samples of the separated digital chrominance signal are clocked into first and second registers such that the first register is loaded with samples of a first color mixture signal and the second register contains samples of a second color mixture signal. Output taps are connected between various ones of the stages of the first and second registers and weighting function circuits. The weighting function circuits associated with each register are in turn coupled to respective ladder networks of adders, which combine the weighted signal samples so as to exhibit, at an output stage adder, a lowpass response characteristic which is appropriate for the respective color mixture signal. The two digital registers are aligned in time in accordance with their respective peak impulse response characteristic to produce filtered color mixture signals in a proper timed relationship.

The clock signals which load the samples into the registers are in a predetermined time relationship. In accordance with a further aspect of the present invention, the clock signals are derived from a phase locked loop signal which produces a signal locked in phase to the color burst signal. The phase locked loop signal may be controllably shifted in phase by a tint control circuit, then phase-shifted by a given delay to align the signal with the desired nominal demodulation angle. The phase-shifted signal is increased in frequency to a multiple of the subcarrier signal, thereby producing a sampling signal for the analog to digital converter. Certain ones of the multiple subcarrier frequency signal are gated out to the digital filter arrangement at the color subcarrier frequency to be used as the clock signals for the two color mixture signal registers.

Figures 1, 5:
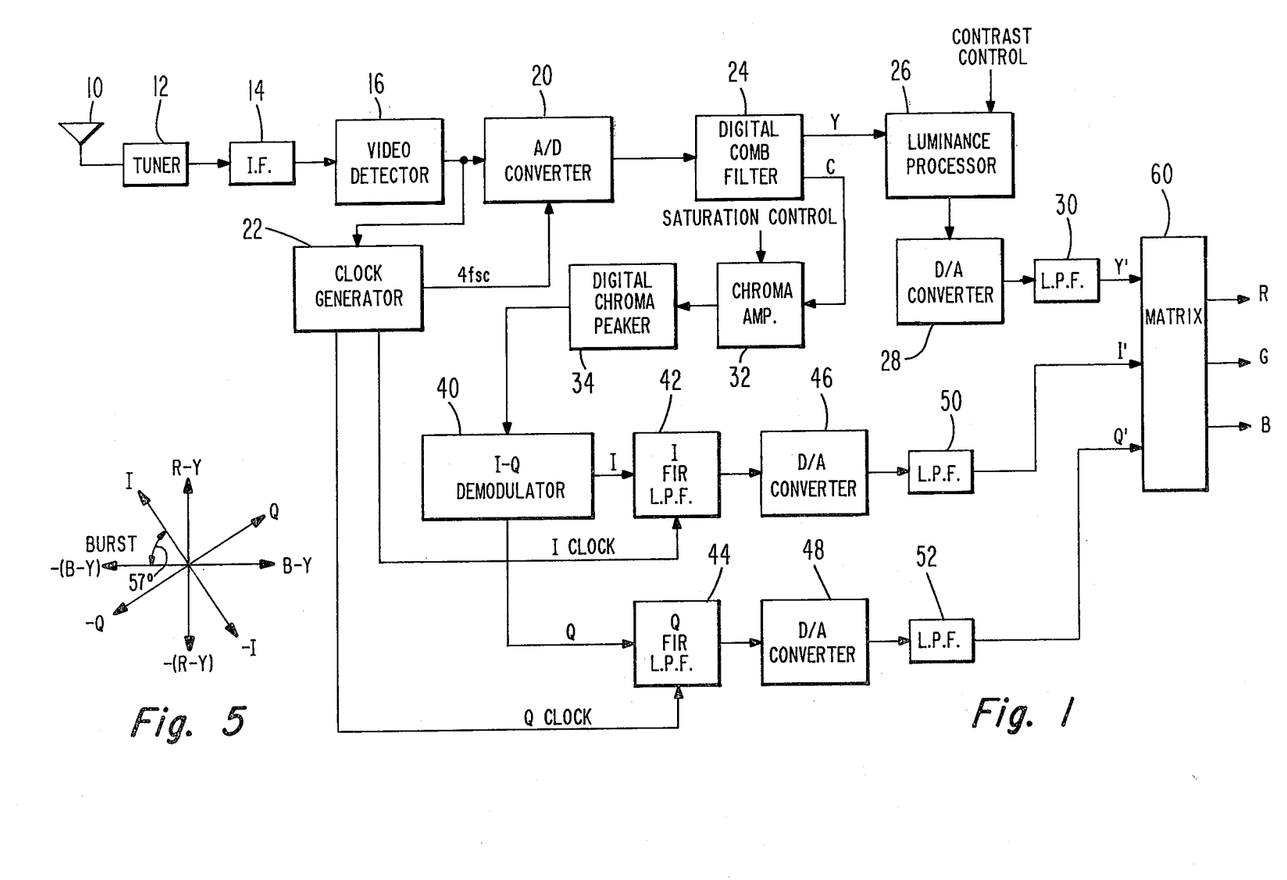
FIG. 1 illustrates in block diagram form a portion of a television receiver including a digital baseband signal processor constructed in accordance with the principles of the present invetion.
FIG. 5 illustrates a color demodulator phasor diagram.

In FIG. 1, a television signal is received by an antenna 10 and successively processed by a tuner 12, intermediate frequency circuits 14, and a video detector 16, which are constructed in a conventional manner. The detected video signal at the output of the detector 16 is applied to the input of an analog to digital (A/D) converter 20. The A/D converter 20 samples the video signal at a rate equal to four times the color subcarrier frequency ($4f_{sc}$), and produces digital samples of the video signal at this rate. Each digital sample, or word, may comprise, for example, eight bits produced in parallel. In an eight-bit system, the analog video signal will be quantized to one of two-hundred and fifty-six descrete levels. The $4f_{sc}$ sampling clock for the A/D converter 20 is developed by a clock generator 22, which produces the signal in phase and frequency locked with the color burst signal of the analog video signal provided by the video detector 16.

The digitized video signal produced by the A/D converter 20 is applied to an inut of a digital comb filter 24, which may be constructed as shown in the article "Digital Television Image Enhancement" by John P. Rossi, volume 84 of the Journal of the SMPTE at 545–51 (1974). The comb filter 24 produces a separated luminance signal, Y, which is applied to a luminance signal processor 26. The luminance processor 26 is responsive to a viewer controlled contrast control signal and produces a processed luminance signal, which is applied to the inputs of a digital to analog (D/A) converter 28. The luminance signal, now in analog form, is filtered by a lowpass filter 30 to remove sampling frequency components, and a processed luminance signal Y' is applied to one input of a matrix arrangement 60.

The comb filter 24 also produces a separated chrominance signal C, which is applied to the input of a chroma amplifier 32. The chroma amplifier 32 amplifies the chrominance signal in response to a viewer controlled color saturation control signal, and applies the amplified chrominance signal to the inut of a digital chroma peaker 34. The chroma peaker 34 is a digital filter which modifies the response characteristic exhibited by the chrominance signal at this point to compensate for the response characteristic of the intermediate frequency circuits 14. The intermediate frequency circuits generally locate the color subcarrier frequency on the lower frequency slope of the I.F. passband, causing the color sidebands to exhibit a rolloff of 6 dB per octave. The chroma peaker 34 compensates for this rolloff to cause the chrominance signal to exhibit an essentially flat amplitude versus frequency response. If the I.F. circuits 14 are designed to provide an essentially flat amplitude versus frequency response for color signals, the chroma peaker 34 may be replaced by a chroma bandpass filter with a response characteristic located about the color subcarrier frequency.

The peaked or bandpassed chrominance signals are then applied to an inut of an I-Q demodulator 40. The I-Q demodulator demodulates the chrominance signal into its baseband I and Q signal components. The demodulated I signal is applied to an input of an I finite impulse response (FIR) filter 42, and the demodulated Q signal is applied to an input of a Q FIR filter 44. The I filter has a passband extending from zero to approximately 1.5 MHz, and the Q filter has a passband extending from zero to 0.5 MHz. The I and Q filters remove high frequency noise contained in the color signals by reason of the broad bandwidth of the preceding processing circuitry.

The filtered I and Q signals are converted to analog signals by D/A converters 46 and 48, respectively, and the analog signals are then filtered by lowpass filters 50 and 52 to remove sampling frequency components. The resultant I' and Q' signals are applied to the matrix arrangement 60, where they are matrixed with the Y' signal to produce R, G and B output signals. The matrix arrangement may comprise, for example, a resistive signal combining matrix.

Figure 2:
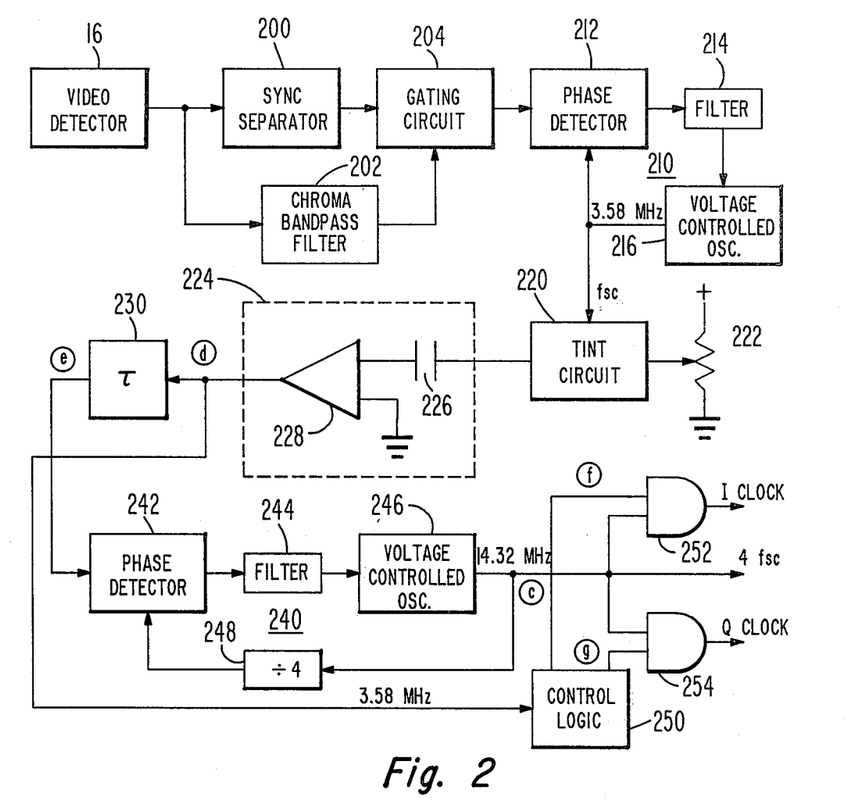
FIG. 2 illustrates, partially in block diagram form and partially in schematic diagram form, a clock generator arrangement suitable for use in the television receiver of FIG. 1 and constructed in accordance with the principles of the present invention.

The clock generator 22 of FIG. 1 is shown in further detail in FIG. 2. The video detector 16 applies the detected video signal to a synchronization signal separator 200 and a chroma bandpass filter 202. Separated sync pulses and signals of the chrominance frequency are applied to inputs of a gating circuit 204, which gates the color burst signal provided by the chroma bandpass filter 202 to a phase detector 212. The phase detector 212 is coupled in a phase locked loop with a filter 214 and a voltage controlled oscillator 216 to cause the oscillator 216 to produce a reference signal at the color subcarrier frequency which is locked in phase with the color burst signal.

The color reference signal is applied to a tint control circuit 220, which is capable of shifting the phase of the reference signal in accordance with the setting of a viewer controlled tint control 222. The reference signal, as adjusted for tint, is applied to a squaring circuit 224, which includes a capacitor 226 and a comparator 228. The capacitor A.C. couples the reference signal to one input of the comparator 228 which swings the signal about a reference voltage level (ground). Since the second input of the comparator is coupled to ground, the comparator will produce a square-wave replica of the reference signal.

The ouput of the squaring circuit 224 is coupled to the inut of a delay element 230, and to the input of control logic 250. The delay element 230 shifts the phase of the reference signal by 57° for demodulation of the color signal along the I and Q axes. The phase-shifted reference signal is then applied to the input of a phase detector 242 of a phase-locked loop 240. The phase-locked loop 240 additionally includes a filter 244, a voltage-controlled oscillator 246, and a divider 248. The voltage-controlled oscillator 246 will thus produce a sampling signal at a frequency of four times the reference signal frequency ($4f_{sc}$) which is locked in phase with the phase of the reference signal applied to the phase detector 242. In the NTSC system, the reference signal has a frequency of 3.58 MHz, and thus the sampling signal $4f_{sc}$, has a frequency of 14.32 MHz. The sampling signal $4f_{sc}$ is applied to the A/D converter 20 as shown in FIG. 1, and is also applied to inputs of AND gates 252 and 254 as shown in FIG. 2. Outputs from the control logic 250 are also coupled to inuts of AND gates 252 and 254 to gate selected ones of the sampling signal pulses to the I and Q FIR filters 42 and 44.

Figure 3:
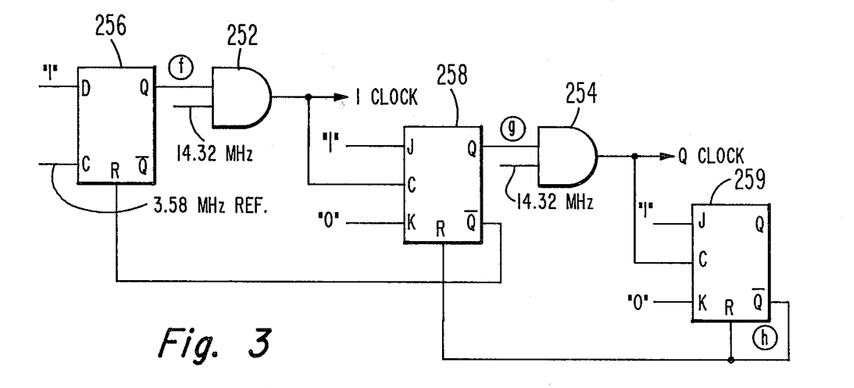
FIG. 3 illustrates, in schematic diagram form, I and Q clock logic circuitry suitable for use in the clock generator of FIG. 2.

The control logic 250 and its connections to AND gates 252 and 254 are shown in further detail in FIG. 3. A "D" type flip-flop 256 has its D (data) input coupled to a logical "1" voltage source, and its C (clock) input is coupled to receive the square wave 3.58 MHz reference signal produced by the squaring circuit 224. The Q output of the flip-flop 256 is coupled to an input of the AND gate 252.

The output of AND gate 252 is coupled to the clock input of a JK flip-flop 258. The J input of flip-flop 258 is coupled to the logical "1" voltage source, and its K input is coupled to a logical "0" voltage source. The Q output of flip-flop 258 is coupled to an input of the AND gate 254, and the $\overline{Q}$ output of the flip-flop is coupled to the reset (R) input of "D" flip-flop 256.

The output of AND gate 254 is coupled to the clock input of a second JK flip-flop 259. The J input of flip-flop 259 is coupled to the logical "1" voltage source, and its K input is coupled to the logical "0;38 voltage source. The $\overline{Q}$ output of flip-flop 259 is coupled to the reset (R) inputs of the JK flip-flops 258 and 259.

Figure 6:
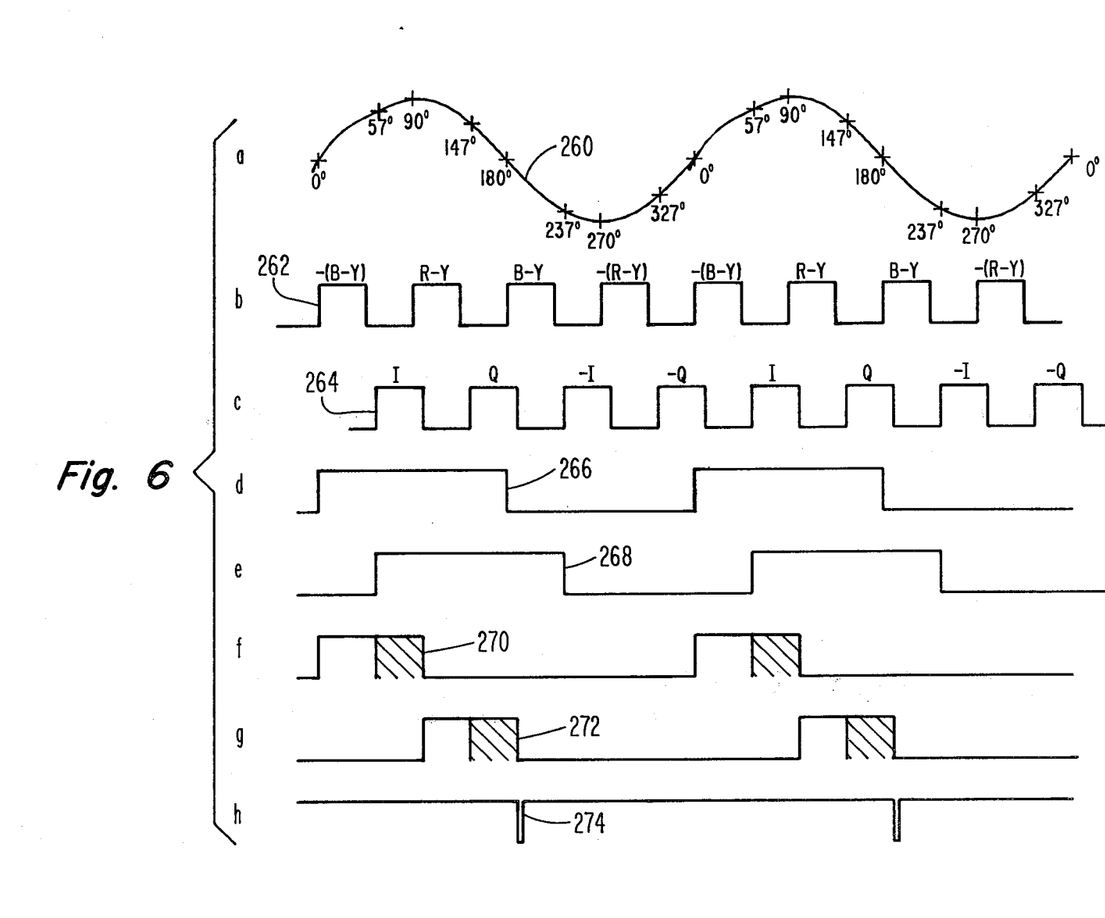
FIG. 6 shows waveforms illustrating the operation of the arrangements of FIGS. 2-4.

The operation of the clock generating arrangement of FIGS. 2 and 3 is explained by referring to the phasor diagram of FIG. 5 and the waveforms of FIG. 6. The phase locked loop 210 produces a reference signal $f_{sc}$ locked in phase and frequency with the color burst signal. Reference signal $f_{SC}$ is represented by waveform 260 of FIG. 6a. FIG. 5 shows that the color difference signals $-(B-Y)$ and $B-Y$ may be recovered by demodulating the chrominance signal at 0° and 180° with respect to the burst-locked reference signal $f_{sc}$. The $R-Y$ and $-(R-Y)$ color difference signals may be recovered by demodulating the chrominance signal at $+90°$ and $-90°$ with respect to the phase of the reference signal $f_{sc}$. When the phase of the reference signal $f_{sc}$ is shifted by 57° as by delay element 230, the I and $-I$ color mixture signals may be recovered by demodulating the chrominance signal at 0° and 180° with respect to this phase-shifted reference signal (i.e. at 57° and 237° with respect to the color burst signal). Similarly, the Q and $-Q$ color mixture signals may be recovered by demodulating the chrominance signal at $+90°$ and $-90°$ with respect to the phase-shifted reference signal (i.e. at 147° and 327° with respect to the color burst signal). These demodulation phase angles are indicated on the burst-locked reference signal $f_{sc}$ of FIG. 6a.

For purposes of the present example, it will be assumed that the tint control 222 is at a setting such that the reference signal $f_{sc}$ undergoes no phase shift in the tint circuit 220. The $f_{sc}$ reference signal is squared by squaring circuit 224 to produce a waveform 266 as shown in FIG. 6d, and indicated in FIG. 2 by the circled letter "d". The square wave reference signal 266 is applied to the delay element 230, which produces a phase-shifted square wave 268 as shown in FIG. 6e and indicated by the circled "e" in FIG. 2. The phase-locked loop 240 will produce a 14.32 MHz sampling signal as shown in FIG. 6c and indicated in FIG. 2 by the circled "c". Since the reference signal was phase-shifted to the I axis by delay element 230, the pulses of the $4f_{sc}$ sampling signal will be aligned to sample the I, Q, $-I$ and $-Q$ signals as shown in FIG. 6c with reference to the waveform 260 of FIG. 6a. If it is desired to demodulate the color difference signals, the delay element 230 can be deleted from the arrangement of FIG. 2, causing the $4f_{sc}$ sampling signal to be phased for recovery of the $-(B-Y)$, $R-Y$, $B-Y$, and $(-R-Y)$ signals, as shown by waveform 262 in FIG. 6b.

The $f_{sc}$ reference signal 266 of FIG. 6d is applied to the C input of flip-flop 256 of FIG. 3, causing this flip-flop to "set" upon the occurrence of a rising edge of waveform 266, as shown by pulse 270 in FIG. 6f. When the I pulse of waveform 264 occurs, both inputs of AND gate 252 are enabled, and the AND gate produces an output pulse for the duration of the I pulse, as indicated by the shaded area of pulse 270. At the end of the I pulse, the I clock pulse terminates, which clocks flip-flop 258 to the "set" condition. As flip-flop 258 sets, its Q output goes "high", as shown by pulse 272 in FIG. 6g. Simultaneously, the $\overline{Q}$ output of flip-flop 258 goes low, resetting flip-flop 256, as indicated by the termination of pulse 270 in FIG. 6f. When the Q pulse of waveform 264 occurs, both inputs of AND gate 254 are enabled, which produces a Q clock pulse for the duration of the Q pulse, as indicated by the shaded area of pulse 272. When the Q pulse of waveform 264 terminates, the Q clock pulse goes low, setting flip-flop 259 and causing its $\overline{Q}$ output to go low, as shown by pulse 274 in FIG. 6h. The low-going $\overline{Q}$ output of flip-flop 259 resets flip-flops 258 and 259, as indicated by the termination of pulses 272 and 274 in FIGS. 6g and 6h. Thus, AND gates 252 and 254 produce pulses at the frequency of the $f_{sc}$ reference signal and at the proper times for revovering the I and Q signals from the digital chrominance signal in the arrangement of FIG. 1. The clock generating arrangement is described in further detail in concurrently filed United States patent application Ser. No. 298,270, entitled "CLOCK GENERATOR FOR A DIGITAL COLOR TELEVISION SIGNAL RECEIVER".

Figure 4:
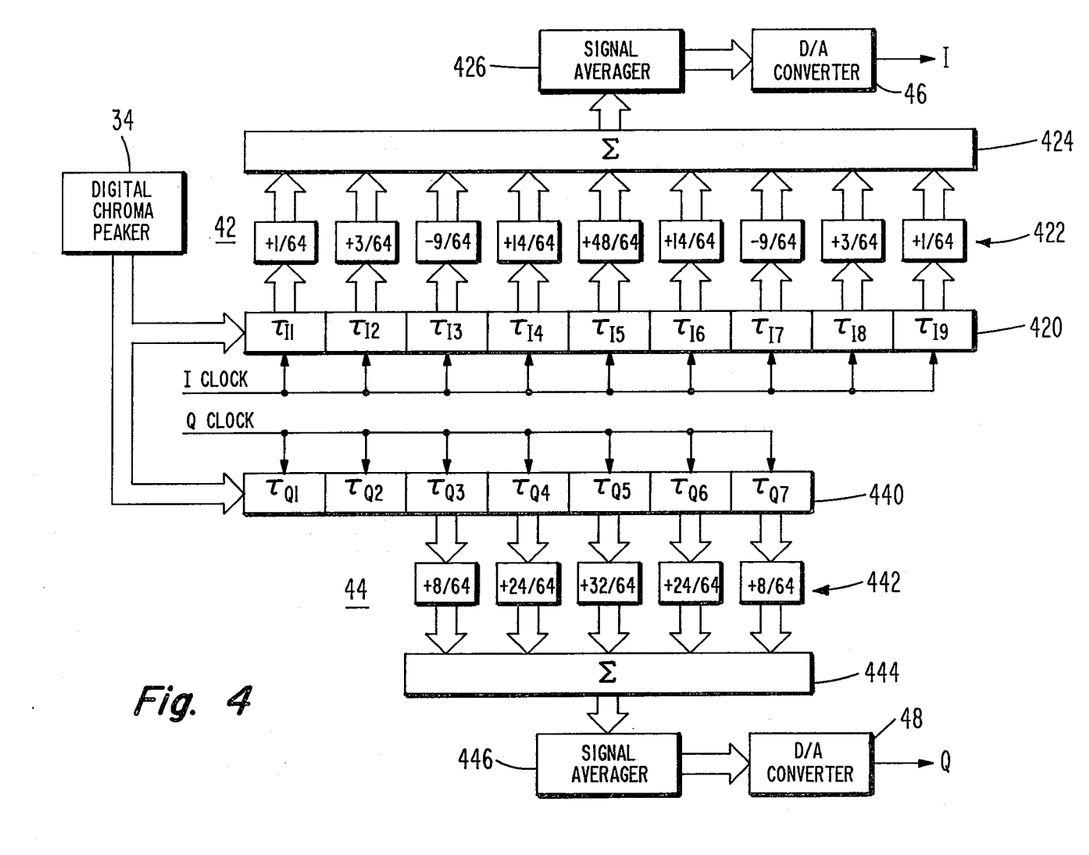
FIG. 4 illustrates, in block diagram form, a digital color signal demodulator and filter constructed in accordance with the principles of the present invention.
Figures 7, 9:
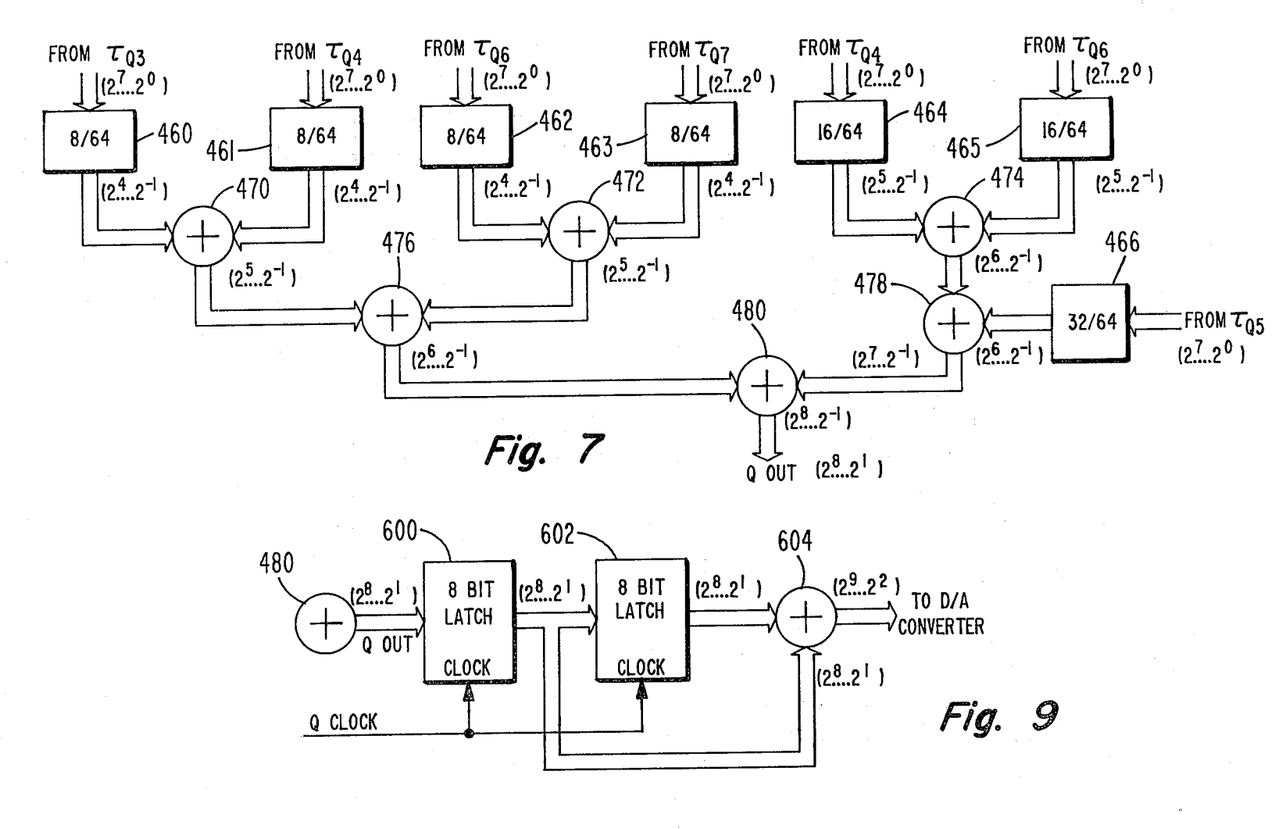
FIG. 7 illustrates, in block diagram form, the weighting function and adder ladder network of the Q filter of FIG. 4.
FIG. 9 illustrates, in block diagram form, a more detailed arrangement of the signal averaging circuits of FIG. 4.
Figure 8:
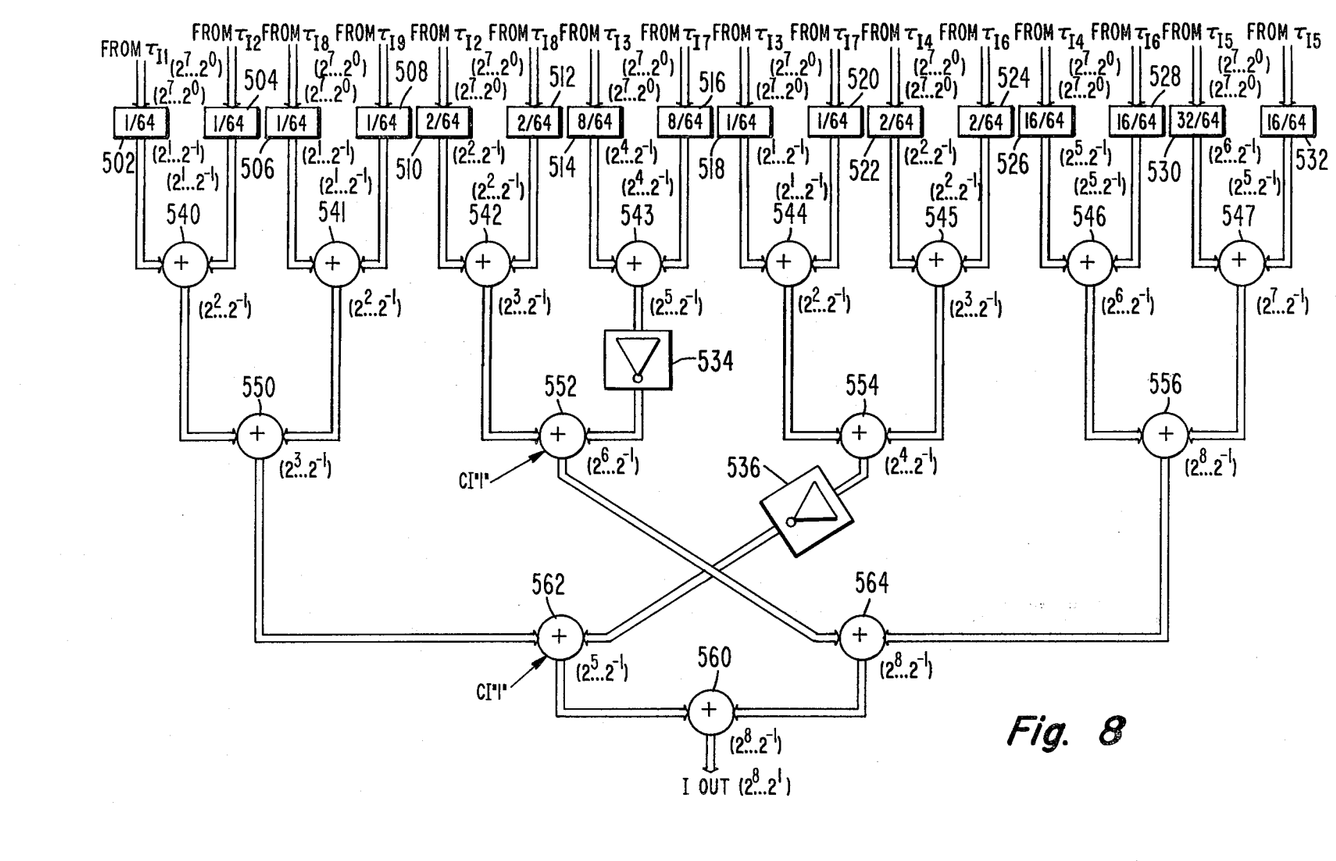
FIG. 8 illustrates, in block diagram form, the weighting function and adder ladder network of the I filter of FIG. 4.

The I-Q demodulator 40, the I FIR filter 42, and the Q FIR filter 44 of FIG. 1 are constructed in accordance with the principles of the present invention as shown in FIGS. 4, 7 and 8. The eight-bit chrominance signal produced by the digital chroma peaker 34 is applied in parallel to two shift registers 420 and 440 which are capable of shifting eight-bit words. In the remaining FIGURES, the broad stripe connections represent parallel lines of digital information.

The eight bit words of the chrominance signal are clocked into the first stage $\tau_{I1}$ of the I register 420 by the I clock, which also shifts the words through the register 420 to the last stage $\tau_{I9}$. A new data word is loaded in the first stage $\tau_{I1}$ during every I pulse of FIG. 6c, which occur at a phase angle of 57° with respect to the color burst signal of FIG. 6a. The I data words are thus clocked through the register at a 3.58 MHZ rate.

The shift register stages $\tau_{I1}$ through $\tau_{I9}$ are tapped to provide eight-bit output words for weighting function circuits shown at 422. Each of the weighting function circuits multiplies the tapped shift register signal by the weighting coefficient shown in the respective block in FIG. 4. The tap weighted signals are then applied to a summing network 424, which combines the tap weighted signals to produce a filtered I signal. The filtered I signal is then applied to the input of a signal averaging circuit 426, which will be described subsequently. The signal averaging circuit improves the signal to noise ratio of the applied signal, and its output is coupled to the input of the D/A converter 46, which reproduces the I signal in analog form.

In a similar manner, Q signal samples are clocked into and through the Q register 440 at a 3.58 MHz rate by the Q clock. Stages $\tau_{Q1}$ and $\tau_{Q2}$ of this register provide delay prior to tapped stages $\tau_{Q3}$ through $\tau_{Q7}$. Output signals from stages $\tau_{Q3}$ through $\tau_{Q7}$ are applied to weighting function circuits shown at 442, and tap weighted signals are then combined in a summing network 444. The filtered Q signal at the output of the summing network 444 is applied to a second signal averaging circuit 446, the output of which is coupled to the input of D/A converter 48 to convert the filtered Q signal to an analog signal.

The digital I and Q filters of FIG. 4 perform I and Q demodulation due to the clocking of registers 420 and 440 by the I and Q clocks, respectively, which shift I signal samples into the I register 420 and Q signal samples into the Q register 440. Since the registers are both clocked at a 3.58 MHz rate, the two filters exhibit equal group delays for proper phasing of the demodulated signals, and since the values of the weighting functions are symmetrical about the center taps of the two filters, the filters will exhibit linear phase characteristics. The I FIR filter 42 attenuates frequencies above the 1.5 MHz upper frequency of the I signal passband, to eliminate high frequency noise, such as white noise, from the color mixture signal. Similarly, the Q FIR filter 44 eliminates noise above the 0.5 upper frequency of the Q signal. In the illustrated embodiment, the I FIR filter has nine weighting function circuits 422, and the Q FIR filter has five weighting function circuits 442. The number of weighting function circuits shown has been found to provide desirable response characteristics for the I and Q filters using inverse power of two coefficients without excessive circutry requirements. Lesser numbers of weighting function circuits was found to provide unsatisfactory response characteristics and greater number of weighting function circuits were found not to provide a significant improvement in performance.

In addition, the proper phase relationship of the demodulated I and Q signals is maintained by aligning the FIR filters in accordance with their impulse response characteristics. The impulse responses of the two FIR filters are centered about their center taps: tapped stage $\tau_{I5}$ of the I filter 42 and tapped stage $\tau_{Q5}$ of the Q filter 44. In order to align these taps, stages $\tau_{Q1}$ and $\tau_{Q2}$ are coupled ahead of tapped Q filter stages $\tau_{Q3}$ through $\tau_{Q7}$.

The substantially equal group delays of the analog I and Q signals produced by D/A converters 46 and 48 are maintained by constructing lowpass filters 50 and 52 to have substantially equal response characteristics. These filters are used to eliminate clock signal frequencies from the I and Q signals, and therefore must attenuate signals of the 3.58 MHz I and Q clock signal frequency. In addition, it is desirable to attenuate the first subharmonic frequency of the clock frequency, of 1.79 MHz. Thus, filters 50 and 52 are each designed to have a 3 dB point in the vicinity of 1.5 to 1.6 MHz.

The weighting function circuits 442 and the summing network 444 of the Q FIR filter of FIG. 4 are shown in greater detail in FIG. 7. The weighting function circuits and summing network are configured in a shift and add adder tree arrangement. The eight bit lines from the shift register 440 are identified as $2^7 \ldots 2^0$, from most significant bit (MSB) to least significant bit (LSB). The weighting function values of circuits 442 in FIG. 4 are all seen to be multiples of inverse powers of two. Thus, the 8/64 weight, for instance, may be produced by shifting the eight-bit word from the shift register to the right by three places, so that the $2^7$ bit is in the $2^4$ bit location, the $2^6$ bit is in the $2^3$ bit location, etc. Furthermore, shift registers are not needed to perform this shift. In practice, the same effect is achieved in the arrangement of FIG. 7 by applying the $2^7$ bit of the output of stage $\tau_{Q3}$ to the $2^4$ bit input of an adder 470, the $2^6$ bit to the $2^3$ bit input of the adder, etc. The weighting function circuit 460 in FIG. 7 connotes this coupling, as do weighting function circuits 461, 462, and 463, which couple the outputs of stages $\tau_{Q4}$, $\tau_{Q6}$, and $\tau_{Q7}$ to the inputs of adders 470 and 472.

In a similar manner, weighting function circuits 464 and 465 divide signals from stages $\tau_{Q4}$ and $\tau_{Q6}$ by 16/64 by shifting the signals two places to the right in their coupling to the inputs of an adder 474. Weighting function circuit 466 divides the signal from stage $\tau_{Q5}$ by 32/64 by shifting the signal to the right by one place in coupling it to an adder 478.

The adders 470, 472, 474 and 478 receive weighted words scaled so that the LSB has a value of $2^{-1}$. Bits of lesser significance are not used.

It is also seen in FIG. 4 that the signals from stages $\tau_{Q4}$ and $\tau_{Q6}$ are weighted by 24/64. This weight is achieved by dividing the outputs of stages $\tau_{Q4}$ and $\tau_{Q6}$ by 8/64 and 16/64 by circuits 461, 464 and 462, 465 respectively. The addition of these two weighted signals in the adder tree produces weighted signal components of 24/64 in the final output.

Figure 10:
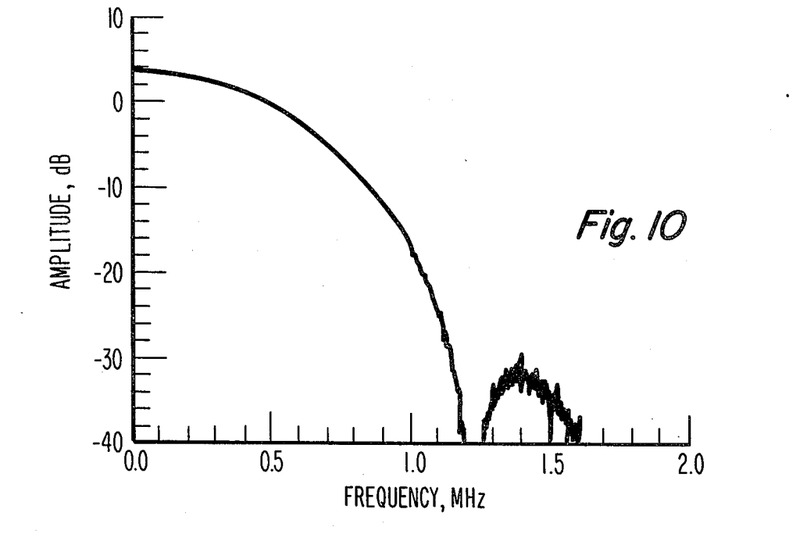
FIG. 10 illustrates the amplitude versus frequency response of the Q filter of FIG. 4.

In the adder tree, outputs of adders 470 and 472 are coupled to inputs of an adder 476, the output of which is coupled to an input of an adder 480. The output of adder 474 is coupled to a second input of adder 478, the output of which is coupled to a second input of adder 480. A ten bit Q signal ($2^8 \ldots 2^{-1}$) is produced at the output of adder 480. The eight most significant bits of this Q output ($2^8 \ldots 2^1$) are used by the signal averaging circuit 446, which is constructed to receive eight bit data words. The Q FIR filter, when constructed as shown in FIGS. 4 and 7, exhibits a response characteristic as shown in FIG. 10. The characteristic is seen to exhibit a secondary response between approximately 1.25 and 1.6 MHz, which will contain noise, but is attenuated by at least 30 dB relative to the Q signal in the band of 0 to 0.5 MHz. The noise components will be even further reduced by the signal averaging circuit 446.

The weighting function circuits 422 and the summing network 424 of the I FIR filter of FIG. 4 are shown in FIG. 8 in further detail. As in the arrangement of FIG. 7, the weighting functions used are all multiples of inverse powers of two, permitting the use of the shift and add technique for signal weighting. Signal weighting is again accomplished by applying selected most significant bits of the data words from the shift register 420 to the first rank of adders in an adder tree arrangement, in which the LSB has a value of $2^{-1}$.

In FIG. 8, data words from stages $\tau_{I1}$ and $\tau_{I2}$ are weighted by 1/64 by applying the three most significant bits of these words to the inputs of an adder 540, as indicated by weighting function blocks 502 and 504. Blocks 506 and 508 indicate that similar weights are applied to data words from stages $\tau_{I8}$ and $\tau_{I9}$ which are applied to inputs of an adder 541. Similarly, data words from stages $\tau_{I3}$ and $\tau_{I7}$, are weighted by 1/64 as indicated by blocks 518 and 520, and are applied to inputs of an adder 544.

Data words from stages $\tau_{I2}$ and $\tau_{I8}$ are weighted by 2/64 by applying the four most significant bits of these words to inputs of an adder 542. Data words from stages $\tau_{I4}$ and $\tau_{I6}$ are also weighted by 2/64 and applied to inputs of an adder 545.

Data words from stages $\tau_{I3}$ and $\tau_{I7}$ are weighted by 8/64 by applying the six most significant bits of words from these stages to the inputs of an adder 543. Data words from stages $\tau_{I4}$ and $\tau_{I6}$ are weighted by 16/64 by applying the seven most significant bits of words from these stages to the inputs of an adder 546. Finally, data words from stages $\tau_{I5}$ are weighted by 32/64 and 16/64 by applying the eight and seven most significant bits, respectively, to inputs of an adder 547. The adder 547 will then produce data words of stage $\tau_{I5}$ weighted by 48/64, which is the desired weight for words of this stage.

The outputs of adders 540 and 541 are coupled to inputs of an adder 550, the output of which is coupled to an input of an adder 562. The output of adder 542 is coupled to an input of an adder 552. The outputs of adders 544 and 545 are coupled to inputs of an adder 554. The outputs of adders 546 and 547 are coupled to inuts of an adder 556, the output of which is coupled to an input of an adder 564.

In FIG. 4, it is seen that data words from stages $\tau_{I3}$ and $\tau_{I7}$ are weighted by minus 9/64. The minus sign is produced by subtractively combining weighted data from these stages with the other data words in FIG. 8. Words from these two taps are weighted by 8/64 at the output of adder 543. These words are then subtractively combined with weighted data from adder 542 in adder 552. Output data of adder 543 is two's complemented for subtraction by, first, inverting all bits of the data in inverting circuit 534, then adding a "one" to the inverted data by applying a logical "1" to the carry in input of adder 552. The output of adder 552, including two terms weighted by $-(8/64)$, is coupled to a second input of adder 564.

Figure 11:
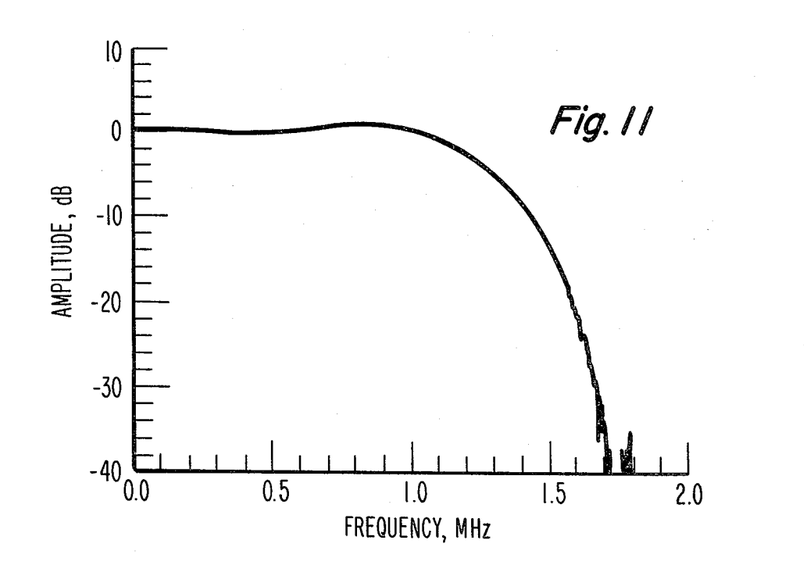
FIG. 11 illustrates the amplitude versus frequency response of the I filter of FIG. 4.

Similarly, the output data produced by adder 554 is subtractively combined with the rest of the data in the adder tree by inverting all bits in an inverting circuit 536, then applying the inverted data together with a carry in logical "1" to a second input of adder 562. The outputs of adders 562 and 564 are coupled to inputs of an adder 560, which produces the filtered I signal. In adder 560, tap weighted values of $-(8/64)$ coupled from stages $\tau_{I3}$ and $\tau_{I7}$ by way of adder 564 are combined with weighed values of $-(1/64)$ from the same stages by way of adder 562 to produce the desired weighted value of $-(9/64)$ of the data from stages $\tau_{I3}$ and $\tau_{I7}$ in the final output. Similarly, the final adder 560 combines weighted values of $-(2/64)$ from stages $\tau_{I4}$ and $\tau_{I6}$ with weighted values of $(16/64)$ from these stages to produce the desired term of $(14/64)$ of data from stages $\tau_{I4}$ and $\tau_{I6}$ in the final output. The frequency response characteristic of the I filter is shown in FIG. 11.

It has been found that a certain amount of time is required for the I and Q FIR filters to settle between the moment that the I and Q clocks shift a new data array into the tapped stages of shift registers 420 and 440, and the moment that stable output signals are produced at the outputs of adders 480 and 560. This settling time is a function of the number of levels, or ranks, of adders in the trees and the propagation delay times of the adders. In addition, different signal paths from the shift registers to the filter outputs have different delays. For instance, in the Q filter of FIG. 7, data words from $\tau_{Q5}$ pass through only two adders (478 and 480) on their path to the filter output, whereas all other signals must pass through three adders. During the time required for the tapped signals to pass to the outputs, the filter output signals are unreliable and can produce ripple in the output signals as the filters settle. To prevent this ripple from distrubing the output signal, signal averaging circuits 426 and 446 are used at the filter outputs to latch the output signals during stable time periods, and to average consecutive signals to provide a 3 dB improvement in the signal-to-noise ratio of the I and Q signals.

Signal averaging circuit 446 is shown in greater detail in FIG. 9. Signal averaging circuit 426 is constructed in a similar manner. In FIG. 9, the final adder 480 of the Q FIR filter has its output coupled to the input of an eight-bit latch or storage register 600. The output of eight-bit latch 600 is coupled to the input of a second eight-bit latch 602, and to an adder 604. The output of latch 602 is coupled to a second input of adder 604. Latches 600 and 602 are clocked by the filter clock, in this case, the Q clock.

In operation, the Q clock transition that shifts the Q data words through the shift register 440 also latches the filtered Q signal into the latch 600. The new shift register data now begins to pass through the adder tree, but the output is now isolated because the latch has stored the previous filtered Q signal value. As the latch 600 is storing this Q signal, the Q signal previously stored in latch 600 is simultaneously latched into latch 602. The latches now contain consecutive Q signal values, which are applied to adder 604. The latches apply eight-bit words ($2^8 \ldots 2^1$) to adder 604, which adds the two words to produce a nine-bit sum word. Only the eight most significant bits of the sum word ($2^9 \ldots 2^2$) are passed on to the D/A converter, effectively averaging the latched Q words. A three dB signal-to-noise improvement is provided by this signal averaging.

By use of the signal averaging circuit, the Q filter adder tree has almost a full cycle of the 3.58 MHz Q clock to settle before its output is again sampled and latched into latch 600. This substantial settling time period permits the use of relatively slow logic in the adder tree. Moreover, it is seen that only a single clocking signal, the Q clock, is needed to clock both the shift register and the signal averaging circuit. The signal averaging circuits are described in greater detail in concurrently filed United States patent application Ser. No. 298,255 entitled "DIGITAL VIDEO SIGNAL PROCESSING FILTERS WITH SIGNAL-TO-NOISE ENHANCEMENT".

What is claimed is:

1. In a television receiver, including a source of color reference signals, and a source of digital chrominance signals, a color signal demodulator and filter arrangement comprising:
    means for producing a first clock signal having a first phase relationship with respect to said color reference signal;
    means for producing a second clock signal having a second phase relationship with respect to said color reference signal;
    a first digital filter having inputs responsive to said digital chrominance signal and said first clock signal, and an output at which a first demodulated and filtered color mixture signal is produced, including a first tapped shift register arrangement through which samples of said digital chrominance signal are shifted in response to said first clock signal; first weighting means coupled to taps of said first shift register for weighting signals on said taps; and means for combining said tap weighted signals produced by said first weighting means and having an output at which said first demodulated and filtered color mixture signal is produced; and
    a second digital filter having inputs responsive to said digital chrominance signal and said second clock signal, and an output at which a second demodulated and filtered color mixture signal is produced, including a second tapped shift register arrangement through which samples of said digital chrominance signal are shifted in response to said second clock signal; second weighting means coupled to taps of said second shift register for weighting signals on said taps; and means for combining said tap weighted signals produced by said second weighting means and having an output at which said second demodulated and filtered color mixture signal is produced.

2. The arrangement of claim 1, further comprising a source of analog video signals including a color burst component of a given frequency, and wherein said source of digital chrominance signals comprises:
    means responsive to said color burst component for producing a sampling signal having a frequency which is a multiple of the frequency of said color burst signal component and a given phase relationship with respect to said color burst signal component;

means responsive to said analog video signals for sampling said signals in response to said sampling signal to produce digital video signal samples; and means responsive to said digital video signal samples for producing separated digital chrominance signals.

3. The arrangement of claim 2, wherein said sampling signal producing means includes means for generating a plurality of pulses during a time interval equal to one cycle of said color burst signal component;

said first clock signal producing means includes means for producing a clock pulse every color burst signal cycle in response to a first one of said plurality of sampling signal pulses; and said second clock signal producing means includes means for producing a clock pulse every color burst signal cycle in response to a second one of said plurality of sampling signal pulses.

4. The arrangement of claim 1 or 3, wherein said first digital filter comprises a FIR filter, said first tapped shift register comprises a plurality of serially coupled stages including a first stage coupled to receive said digital chrominance signal, said stages inluding a plurality of output taps; said first-named combining means comprises an adder tree arrangement; and said first weighting means includes means for coupling ones of said output taps of said adder tree arrangement in a shift-and-add type configuration.

5. The arrangement of claim 4, wherein said second digital filter comprises a FIR filter; said second tapped shift register comprises a plurality of serially coupled stages, including a first stage coupled to receive said digital chrominance signal, said stages including a plurality of output taps; said second-named combining means comprises a second adder tree arrangement; and said second weighting means includes means for coupling ones of said output taps of said second tapped shift register to said second adder tree arrangement in a shift-and-add type configuration.

6. In a television receiver, including a source of color reference signals and a source of digital chrominance signals, a color signal demodulator and filter arrangement comprising:

means for producing a first clock signal having a first phase relationship with respect to said color reference signals;

means for producing a second clock signal having a second phase relationship with respect to said color reference signals;

a first FIR filter including a first tapped shift register clocked by said first clock signal and having an input coupled to receive said digital chrominance signals; a plurality of weighting function circuits coupled to taps of said first shift register; and first means coupled to said weighting function circuits for summing tap weighted signals to produce, at an output, a first demodulated and filtered clock mixture signal, said first FIR filter exhibiting an impulse response concentrated about one of said first shift register taps, and a given group delay between said input and said one tap;

a second FIR filter including a second tapped shift register clocked by said second clock signal and having an input coupled to receive said digital chrominance signals; a plurality of weighting function circuits coupled to said second shift register taps; and second means coupled to said weighting function circuits for summing tap weighted signals to produce, at an output, a second demodulated and filtered color mixture signal, said second FIR filter exhibiting an impulse response concentrated about one of said second shift register taps and a group delay between said input and said one tap of said second shift register which is substantially equal to said given group delay of said first FIR filter.

7. The arrangement of claim 6, wherein the number of tapped shift register stages and weighting function circuits of said FIR filter exceed the number of tapped shift register stages and weighting function circuits of said second FIR filter; and wherein said shift register of said second FIR filter includes an untapped shift register stage coupled between said input and said tapped stages.

8. The arrangement of claim 6 or 7, further comprising:

first processing means, coupled to the output of said first FIR filter, and having an output for producing a first processed analog color signal;

a first lowpass filter coupled to said output of said first processing means and exhibiting a given phase versus frequency response characteristic;

second processing means, coupled to the output of said second FIR filter, and having an output for producing a second processed analog color signal; and a second lowpass filter coupled to said output of said second processing means and exhibiting a phase versus frequency response characteristic which is substantially the same as said given characteristic of said first lowpass filter.

9. The arrangement of claim 8, wherein the frequency of said first clock signal is substantially equal to the frequency of said second clock signal; and wherein said first and second lowpass filters are constructed to exhibit transition bands substantially below the second subharmonic frequencies of said clock signal frequencies.

10. The arrangement of claim 6 or 7 wherein the frequencies of said first and second clock signals are substantially equal to the frequency of said color reference signal, the number of tapped shift register stages of said first FIR filter is nine; and the number of tapped shift register stages of said second FIR filter is five.

11. The arrangement of claim 10, wherein said shift register of said second FIR filter includes two untapped stages coupled between said input and said tapped stages.

12. In a television receiver, including a source of analog video signals having a color burst signal component; an I and Q color mixture signal processing circuit comprising:

a clock signal generator having an input responsive to said color burst signal, a first output at which a sampling signal is produced having sampling pulses locked in phase with the I and Q phases of said color burst signal, a second output at which an I clock signal is produced having pulses locked with the I phase of said color burst signal, and a third output at which a Q clock signal is produced having pulses locked with the Q phase of said color burst signal;

means responsive to said analog video signals and said sampling signal for producing digital video signal samples;

means responsive to said digital video signal samples for producing digital chrominance signal samples;

an I FIR filter including a tapped shift register having an input coupled to receive said digital chrominance signal samples and clocked by said I clock signal, and an output at which a filtered I signal is produced, said I FIR filter exhibiting an impulse response characteristic concentrated around one of said shift register taps, a given group delay between said input and said one shift register tap, and a transition band over a given band of frequencies;

a Q FIR filter including a tapped shift register having an input coupled to receive said digital chrominance signal samples and clocked by said Q clock signal, and an output at which a filtered Q signal is produced, said Q FIR filter exhibiting an impulse response characteristic concentrated around one of said Q shift register taps, a group delay between said input and said one Q shift register tap which is substantially equal to said given group delay, and a transition band over a band of frequencies which is lower in frequency than said given band;

first processing means coupled to the output of said I FIR filter, and having an output for producing a first processed analog color signal;

a first lowpass filter coupled to said output of said first processing means and exhibiting a given amplitude versus frequency response characteristic;

second processing means coupled to the output of said Q FIR filter, and having an output for producing a second processed analog color signal; and a second lowpass filter coupled to said output of said second processing means and exhibiting an amplitude versus frequency characteristic which is substantially equal to said given characteristic.

* * * * *

UNITED STATES PATENT AND TRADEMARK OFFICE
CERTIFICATE OF CORRECTION

PATENT NO. : 4,415,918

DATED : Nov. 15, 1983

INVENTOR(S) : Henry G. Lewis, Jr.

It is certified that error appears in the above-identified patent and that said Letters Patent is hereby corrected as shown below:

| | |
|---|---|
| Column 2, line 28 | "invetion" should be --invention--. |
| Column 3, line 8 | "inut" should be --input--. |
| Column 4, line 24 | "inut" should be --input--. |
| Column 4, line 42 | "inuts" should be --inputs--. |
| Column 4, line 64 | ""0;38" should be --"0". |
| Column 5, line 57 | "Q" should be --$\overline{Q}$--. |
| Column 6, line 2 | revovering" should be --recovering--. |
| Column 8, line 62 | "inuts" should be --inputs--. |
| Column 11, line 25 | "inluding" should be --including--. |

Signed and Sealed this

Second Day of October 1984

[SEAL]

Attest:

GERALD J. MOSSINGHOFF

Attesting Officer

Commissioner of Patents and Trademarks